(12) United States Patent
Murray et al.

(10) Patent No.: US 8,753,425 B2
(45) Date of Patent: Jun. 17, 2014

(54) METHOD OF MAKING A GAS SEPARATION MOLECULAR SIEVE MEMBRANE

(75) Inventors: Brendan Dermot Murray, Houston, TX (US); Paul Jason Williams, Richmond, TX (US)

(73) Assignee: Shell Oil Company, Houston, TX (US)

( * ) Notice: Subject to any disclaimer, the term of this patent is extended or adjusted under 35 U.S.C. 154(b) by 230 days.

(21) Appl. No.: 13/322,733

(22) PCT Filed: May 27, 2010

(86) PCT No.: PCT/US2010/036357
§ 371 (c)(1),
(2), (4) Date: Nov. 28, 2011

(87) PCT Pub. No.: WO2010/138692
PCT Pub. Date: Dec. 2, 2010

(65) Prior Publication Data
US 2012/0067207 A1     Mar. 22, 2012

Related U.S. Application Data

(60) Provisional application No. 61/182,260, filed on May 29, 2009.

(51) Int. Cl.
*B01D 71/02* (2006.01)
*B01D 53/22* (2006.01)
*B05D 1/36* (2006.01)

(52) U.S. Cl.
USPC ............ 95/45; 95/51; 96/11; 427/203; 502/4; 502/214

(58) Field of Classification Search
USPC .............. 95/45, 51; 96/4, 11; 427/203, 397.7; 502/4, 214
See application file for complete search history.

(56) References Cited

U.S. PATENT DOCUMENTS

| | | | |
|---|---|---|---|
| 6,177,373 B1 | 1/2001 | Sterte et al. | 502/4 |
| 7,316,727 B2 | 1/2008 | Falconer et al. | 95/51 |
| 2001/0020416 A1* | 9/2001 | Yoshikawa et al. | 95/45 |
| 2004/0147793 A1* | 7/2004 | Mertens et al. | 502/214 |
| 2006/0079725 A1* | 4/2006 | Li et al. | 502/4 |
| 2007/0265484 A1 | 11/2007 | Li et al. | 585/818 |
| 2008/0216650 A1* | 9/2008 | Falconer et al. | 95/51 |

* cited by examiner

*Primary Examiner* — Jason M Greene
(74) *Attorney, Agent, or Firm* — Charles W. Stewart

(57) ABSTRACT

A method of preparing a supported gas separation membrane, comprising: preparing crystalline seeds from a synthesis mixture comprising an aluminum source, a phosphorous source, a silicon source, at least one organic templating agent and water; applying the seeds to a porous support to produce a seeded porous support; contacting the seeded porous support with a synthesis gel under hydrothermal synthesis conditions to produce a coated porous support; and calcining the coated porous support is described. A supported gas separation membrane made by this method is also described.

27 Claims, 1 Drawing Sheet

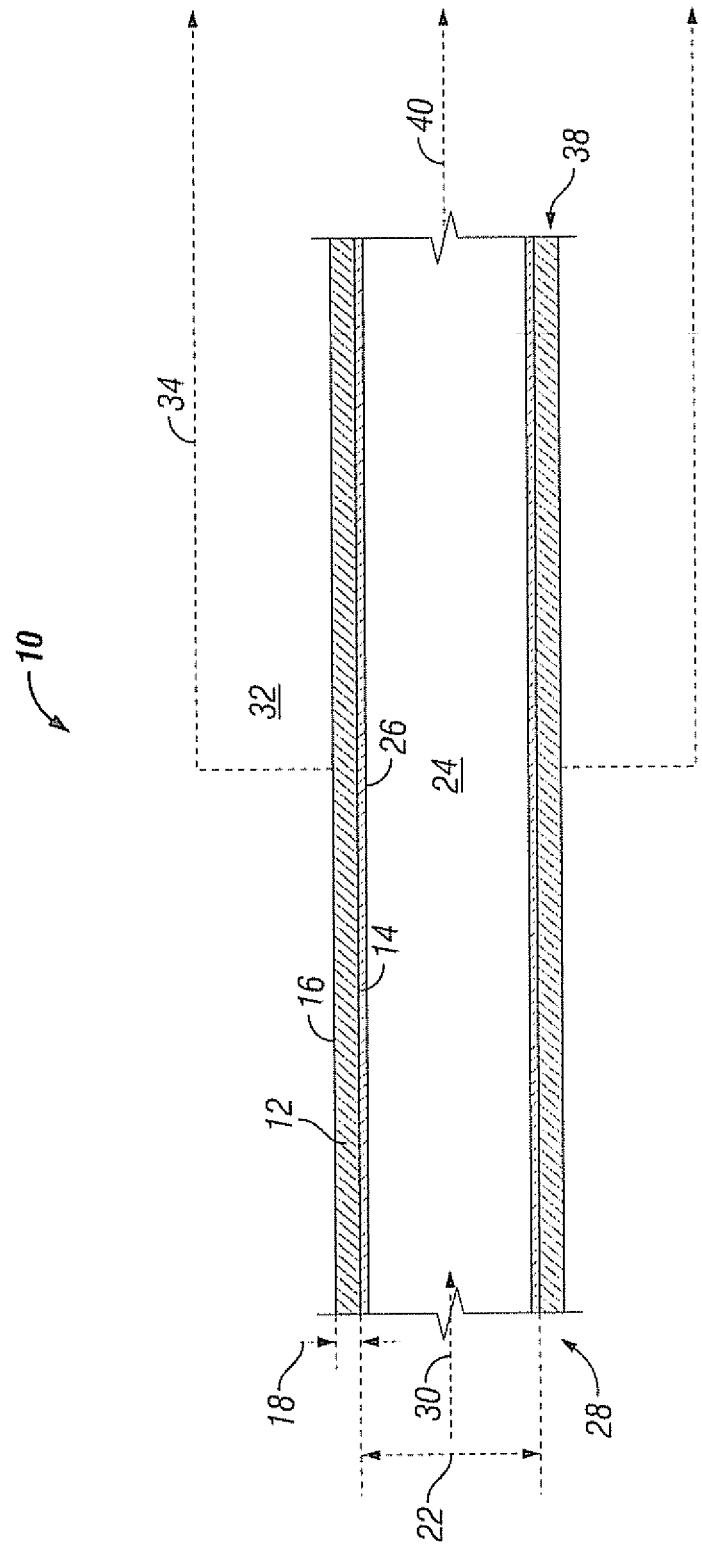

METHOD OF MAKING A GAS SEPARATION MOLECULAR SIEVE MEMBRANE

CROSS REFERENCE TO EARLIER APPLICATIONS

The present application is a national stage application of International application No. PCT/US2010/036357 filed 27 May 2010, which claims priority from U.S. patent application 61/182,260 filed with the USPTO on 29 May 2009, which is incorporated herein by reference.

FIELD OF THE INVENTION

This application relates to a method of making a supported gas separation molecular sieve membrane.

BACKGROUND

The technology of gas separation is important in many fields, and is particularly important in the field of natural gas processing. Many of the sources of natural gas also contain contaminants that can damage the facilities used to produce and transport the natural gas. Carbon dioxide ($CO_2$) and other acidic contaminants such as hydrogen sulfide ($H_2S$) and carbonyl sulfide (COS) are detrimental components of natural gas. It is preferable to separate these contaminants from the natural gas because their presence reduces the energy content of the natural gas, and they are acidic and corrosive in the presence of water. Excessive amounts of $CO_2$ in the presence of water can result in damage to pipelines and treating systems and must be removed during production.

U.S. Pat. No. 7,316,727 describes a gas separation molecular sieve membrane that may be produced on a porous support. A gas mixture is passed through the porous support and the gas separates into different components across the membrane. The patent describes the membrane and a method of making the membrane. The membrane is made of SAPO-34 (silicoaluminophosphate) crystals. The method for making the membrane includes preparing a synthesis gel mixture that is then used to form the SAPO-34 crystals. The synthesis gel mixture comprises an aluminum source, a phosphorous source, a silicon source, one or more organic templating agents and water. U.S. Pat. No. 7,316,727 is herein incorporated by reference in its entirety.

SUMMARY OF THE INVENTION

The invention provides a method of preparing a supported gas separation membrane, comprising: preparing crystalline seeds from a synthesis mixture comprising an aluminum source, a phosphorous source, a silicon source, at least one organic templating agent and water; applying the seeds to a porous support to produce a seeded porous support; contacting the seeded porous support with a synthesis gel under hydrothermal synthesis conditions to produce a coated porous support; and calcining the coated porous support wherein the molar ratio of water to aluminum of the synthesis gel in step (c) is greater than the molar ratio of water to aluminum of the synthesis mixture of step (a).

The invention further provides a supported gas separation membrane made by the above method.

The invention provides a process for separating a first gas component from a gas mixture comprising the first gas component and a second gas component, which process comprises: providing a gas separation molecular sieve membrane prepared by the method of claim 1 having a feed side with a feed inlet and a retentate outlet; and a permeate side, wherein the gas separation molecular sieve is selectively permeable to the first gas component over the second gas component; introducing the gas mixture to the feed inlet yielding a permeate stream from the permeate side of the gas separation molecular sieve membrane and a retentate stream from the retentate outlet wherein the retentate stream is depleted of the first gas component and the permeate stream is rich in the first gas component.

BRIEF DESCRIPTION OF THE DRAWING

FIG. 1 depicts one embodiment of the molecular sieve membrane on a porous tubular support.

DETAILED DESCRIPTION

The invention provides a method of making a supported gas separation molecular sieve membrane using an improved synthesis gel mixture. The method includes preparing crystalline seeds from a synthesis mixture comprising aluminum, phosphorus, silicon, one or more organic templating agents and water. These seeds are used in a later step to grow the molecular sieve membrane on the porous support.

The aluminum source may comprise aluminum alkoxides, for example aluminum isopropoxide, aluminum phosphates, aluminum hydroxide, sodium aluminate, aluminum sulfate, aluminum trichloride, alumina and pseudoboehmite. The preferred sources of aluminum are aluminum isopropoxide and aluminum hydroxide.

The phosphorus source may comprise phosphoric acid. The phosphorus source may comprise organic phosphates, for example triethyl phosphate, and crystalline or amorphous aluminophosphates.

The silicon source may comprise a silica sol. Suitable silica sources also include fumed silica, reactive solid amorphous precipitated silica, silica gel, alkoxides of silicon (silicic acid or alkali metal silicate). The silicon source may be introduced in colloidal form.

The organic templating agent (R) may comprise a quaternary ammonium templating agent. The templating agent may be selected from dipropylamine (DPA), cyclohexylamine (CHA), tetrapropyl ammonium hydroxide, tetrapropyl ammonium bromide, tetrabutyl ammonium hydroxide, tetrabutyl ammonium bromide, tetraethyl ammonium hydroxide (TEAOH), tetraethyl ammonium bromide or combinations thereof.

The synthesis mixture may comprise the components in relative amounts such that the composition of the synthesis gel mixture has the following molar ratios:

1 $Al_2O_3$:a $P_2O_5$:b $SiO_2$:c R:d$H_2O$;

wherein:

a is from 0.01 to 52;
b is from 0.03 to 196;
c is from 0.2 to 5; and
d is from 20 to 1000.

The synthesis mixture is stirred and heated to form crystalline seeds. The seeds are removed from the synthesis mixture by centrifuge, filtration or other separation methods.

The crystalline seeds are then dried. In one embodiment the seeds are calcined. The seeds are calcined at a temperature of from 350° C. to 800° C., preferably at a temperature of from 400° C. to 600° C. The calcination heating rate is preferably from 0.1 to 3° C./min, and more preferably from 0.5 to 2° C./min. The calcination cooling rate is preferably from 0.1 to 5° C./min, and more preferably from 1 to 3° C./min.

The calcined seeds are typically cubic or rectangular crystals with sizes ranging from 0.1 to 8 μm. In one embodiment, the synthesis mixture comprises 99.99% Al($i$-$C_3H_7O$)$_3$ as the aluminum source. In one embodiment, the synthesis mixture comprises 98% Al($i$-$C_3H_7O$)$_3$ as the aluminum source. In one embodiment, the synthesis mixture comprises Al(OH)$_3$ as the aluminum source.

In one embodiment, the aluminum source, phosphoric acid, and deionized water are stirred to form a synthesis mixture solution that appears homogeneous to the eye. The mixture may be stirred for from 5 minutes to 6 hours, preferably from 0.2 hours to 4 hours. Then colloidal silica is added and the resulting solution is stirred for an additional time period. The additional stirring time may be from 5 minutes to 6 hours, preferably from 0.2 hours to 4 hours. The organic templating agent is added to the solution, and the solution is stirred for another time period. The solution may be stirred for from 2 hours to 7 days, preferably from 3 hours to 5 days. The solution is placed in an autoclave and held at 220° C. for 24 hours. The solution is then cooled to room temperature and centrifuged or filtered to separate the seeds that are then washed with de-ionized water. This procedure may be repeated as needed. The precipitated seeds are then dried and calcined at a temperature of from 400° C. to 600° C. for 1 to 24 hours depending on the calcination temperature used. Shorter calcination times can be used when a higher calcination temperature is used. The calcination heating and cooling rates are preferably 1 and 2° C./min respectively.

The seeds formed in the above step are then applied to a porous support. The porous support may be of any shape or geometry suitable for use in the manufacture of a supported molecular sieve membrane. The porous support is capable of having a thin, dense and continuous layer of molecular sieve crystalline seeds deposited thereon. The porous support is made in such a manner as to be significantly permeable to gases. The support should provide little if any resistance to flow therethrough of low molecular weight hydrocarbons, for example, methane, ethane, propane, ethylene, ethyne, propylene, and inorganic compounds, for example, hydrogen, oxygen, carbon dioxide, hydrogen sulfide, carbonyl sulfide, carbon disulfide, and water.

The porous support may be of any suitable geometry, for example planar or curvilinear sheets having an undersurface and a top surface that defines a sheet thickness. The support may be tubular, for example, circular, square, rectangular and polygonal tubular shapes that have an inside surface and an outside surface that define a wall thickness. The inside surface defines a tubular conduit.

In one embodiment, the porous support is a circular tube having an internal diameter in the range of up to 20 mm, but more typically in the range of from 1 mm to 8 mm. In one embodiment where the porous support is a non-circular tube, the maximum internal cross-dimension may be in the range of up to 10 mm, but more typically is in the range of from 1 mm to 8 mm.

In one embodiment, a tubular support may be of from 0.05 meters to 3 meters long, but typically the length of the tubular support is from 0.2 meters to 2 meters long. The preferred length of the tubular support is in the range of from 0.5 m to 2 m.

In one embodiment, the support is planar or sheet material having at least one dimension, length, other than the thickness that is in the range of from 0.01 m to 3 m, preferably of from 0.2 m to 2 m, and more preferably of from 0.5 m to 1.5 m.

The porous support preferably has a relatively large surface area-to-volume ratio. Preferred structures for the porous support include multichannel supports, monolithic supports, and hollow fiber supports.

The porous support may be made of or comprise porous material selected from any materials known to those skilled in the art, including, but not limited to, inorganic porous materials, including α-alumina, γ-alumina, glass, titania, zirconia, carbon, silicon carbide, clays or silicate materials, aerogels, supported aerogels, and supported silica, titania, and zirconia; stainless steel, for example, the 301, 304, 305, 316, 317, and 321 series of stainless steels the HASTELLOY® alloys, for example, B-2, C-4, C-22, C-276, G-30, X and others and the INCONEL® alloys, for example, 600, 625, 690 and 718.

The thickness, porosity, and pore size distribution of the pores of the porous support are selected to provide a gas separation membrane system that has the desired performance characteristics and other desirable properties. A porous support with a relatively small thickness may provide a relatively high gas flux through the support.

The porosity of the porous material may be in the range of from 0.01 to 0.5. Porosity is defined as the proportion of non-solid volume to the total volume (non-solid and solid) of the porous material. The porosity is typically in the range of from 0.05 to 0.3.

The pore size distribution of the pores of the porous material can vary with the median pore diameter typically in the range of from about 0.001 μm to about 15 μm. The median pore diameter may be in the range of from 0.002 μm to 10 μm, or from 0.01 μm to 5 μm.

For certain porous materials it may be advantageous to treat the surface of the porous support prior to laying down the molecular sieve layer thereon by contacting it with a synthesis gel mixture. Several methods of porous support surface treatment that may be used are described in U.S. Pat. No. 6,177,373, which is hereby incorporated by reference. It is preferred to treat the porous support surface as described in US Patent Application Publication No. US 2007/0265484. This publication describes molecular sieve materials that may be used to pretreat the surface of the support, methods for making these molecular sieve materials, and methods of pretreatment of a porous support by the application of the molecular sieve materials. This publication is hereby incorporated by reference.

It is preferred to treat the surface of the porous support by applying silicoaluminophosphate (SAPO) molecular sieve crystals that are in loose form. SAPO-34 molecular sieve crystals are the most preferred of the SAPO crystals for this purpose.

While the size of the crystals applied to the porous support surface may vary, it is desirable that they be colloidal in size, generally having an average size in the range of from 2.5 nm to 5000 nm, or having an average size in the range of from 50 nm to 2000 nm, and more typically, from 100 nm to 1000 nm.

The crystals may be applied to the porous support surface by any suitable method known to those skilled in the art, for example, by the application of a dry crystalline powder or a colloidal suspension to the surface of the porous support. The seeds are applied to the support, and may be applied to only one side of the support. The other side of the support may be covered or treated to prevent contact with the crystalline seeds. Tape comprised of tetrafluoroethylene can be used to cover the other side of the support. In one embodiment one side of the support is wrapped with Teflon® tape.

The application of the molecular sieve crystals to the surface of the porous support will provide a seeded porous support surface that is further subjected to a hydrothermal crystallization to provide a molecular sieve layer on the seeded surface. The hydrothermal crystallization may be conducted by covering the seeded porous support surface with a crystallization solution or synthesis gel mixture that is suitable for the formation of a SAPO molecular sieve under hydrothermal synthesis conditions.

The synthesis gel mixture may comprise an aluminum source, a phosphorus source, a silicon source, one or more organic templating agents (R), and water in relative amounts such that the composition of the synthesis gel mixture has the following molar ratios:

1 $Al_2O_3$:a $P_2O_5$:b $SiO_2$:c R:d$H_2O$;

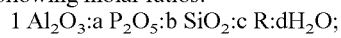

wherein:
a is from 0.01 to 52;
b is from 0.03 to 196;
c is from 0.2 to 5; and
d is from 20 to 1000.

In one embodiment, the synthesis gel mixture has a composition that is the same as or substantially similar to the synthesis mixture used to prepare the crystalline seeds.

In another embodiment, the synthesis gel mixture has a composition that is different than the composition of the synthesis mixture used to prepare the crystalline seeds. The two mixtures may have different molar ratios of components or the source of the respective components may be different or the organic templating agents may be different.

In one embodiment, the synthesis gel mixture is more diluted than the synthesis mixture used to prepare the crystalline seeds. The synthesis gel mixture has a molar ratio of water to aluminum that is greater than the molar ratio of water to aluminum of the synthesis mixture used to prepare the crystalline seeds.

In one embodiment, the molar ratio of water to aluminum of the synthesis gel mixture is at least 100:1. In another embodiment, the molar ratio of water to aluminum is at least 150:1.

In one embodiment, aluminum alkoxide is the aluminum source for the synthesis mixture used to prepare the crystalline seeds and aluminum hydroxide is the aluminum source for the synthesis gel mixture. In addition, different purities of aluminum alkoxide may be used in the two mixtures. In one embodiment, aluminum hydroxide is the aluminum source for the synthesis mixture used to prepare the crystalline seeds and aluminum alkoxide is the aluminum source for the synthesis gel mixture.

In one embodiment the organic templating agent used in the synthesis gel mixture is different from the organic templating agent used in the synthesis mixture for preparing crystalline seeds. When a mixture of organic templating agents is used in the synthesis mixture, a different mixture of organic templating agents may be used in the synthesis gel mixture. In one embodiment, where cyclohexylamine is used as an organic templating agent in the synthesis mixture, it is not used in the synthesis gel mixture.

The synthesis gel mixture may be prepared by any method known to those skilled in the art, but it is typically prepared in a similar manner to the synthesis mixture used to prepare the crystalline seeds.

The hydrothermal synthesis conditions under which the seeded porous support surface is contacted with the synthesis gel mixture include those conditions that suitably provide for the synthesis or crystallization of the desired molecular sieve and formation of the sieve on the porous support. The hydrothermal temperature is typically in the range of from 50 to 300° C.

It is more typical for the temperature to be in the range of from 100 to 275° C. The temperature is preferably in the range of from 125 to 275° C., more preferably from 150 to 225° C. and most preferably from 175 to 220° C.

The hydrothermal synthesis is typically conducted under autogenous pressure, which can be in the range up to 100 bar, and more typically in the range of from 1 bar to 80 bar or from 2 bar to 50 bar.

The contacting of the porous support with a synthesis gel mixture may be carried out for as long as necessary to form the molecular sieve layer on the porous support. The contacting may be carried out for from about 1 hour to about 36 hours, preferably from about 2 hours to about 24 hours and more preferably from about 4 hours to about 10 hours.

The porous support is preferably placed in an autoclave or other vessel that contains the synthesis gel mixture. The hydrothermal synthesis is then carried out under the hydrothermal synthesis conditions described above. The porous support is washed with water, preferably distilled or deionized water, and dried.

The coated porous support now has a molecular sieve membrane layer that has relatively few defects that would allow leakage or passage of gas. The membrane layer is gas-tight due to the presence of the organic templating agent that remains in the pores of the molecular sieve crystals and due to the lack of membrane defects. The coated porous support before its calcination is therefore relatively impermeable to gases such as carbon dioxide and nitrogen.

The typical thickness of the membrane layer of the coated porous support, or the final calcined, coated porous support, may be in the range of from 0.001 μm to 50 μm, but for many gas separation applications, a membrane thickness in the upper end of this range may be too thick to provide for a reasonable gas flux that allows for a desired gas separation. Generally, the membrane layer thickness should be less than 20 μm, and even less than 10 μm. It is desirable for the membrane layer thickness to be in the range of from 0.001 μm to 50 μm, preferably, from 0.01 μm to 20 μm, and most preferably from 0.1 μm to 10 μm.

The coated porous support is then calcined in air at a temperature in the range of from about 300° C. to about 650° C., preferably from about 325° C. to about 625° C., and more preferably from about 350° C. to about 500° C. The calcination step results in the removal of at least a substantial portion of the organic templating agent(s) from the molecular sieve membrane. The calcination heating and cooling rates are preferably from 0.5 to 3° C./min, more preferably from 0.5 to 2° C./min.

The calcined coated porous support of the invention may be used in gas separation applications, and it is particularly useful in the separation of acidic contaminants such as carbon dioxide, and hydrogen sulfide from normally gaseous hydrocarbons such as methane, ethane, propane, butane, ethylene, propylene and butylenes. As noted above, one of the advantages of the inventive method is that it provides for an economical method of manufacturing a supported gas separation membrane which method uses a lower cost synthesis gel mixture to prepare a gas-tight (i.e., substantially defect-free) membrane that is highly selective in the separation of certain gases from gas mixtures, such as, gas mixtures comprising acidic contaminants and methane.

The calcined molecular sieve coated porous support is highly selective in its permeability of $CO_2$ relative to $CH_4$ having a characteristic $CO_2/CH_4$ separation selectivity that is at least 100. A high $CO_2/CH_4$ separation selectivity for the calcined coated porous support is preferred; since, it makes the selective separation of acidic contaminants from a gas mixture comprising methane and acidic contaminants easier; provided that, the membrane is reasonably permeable to acidic contaminants. It is, thus, desirable for the $CO_2/CH_4$ separation selectivity for the calcined coated porous support to be at least 100, preferably, at least 150, and, most preferably, at least 200. These separation selectivities are based on feed composition of 50 mol % $CO_2$, 50 mol % $CH_4$. The feed and permeate pressures are 222 kPa and 84 kPa, respectively ($\Delta=138$ kPa), and the temperature of the membrane is 22° C.

The terms "permeance" and "selectivity" are defined in US 2007/0265484, and they are used herein in the same way. Thus, the $CO_2/CH_4$ separation selectivity characteristic of a supported gas separation molecular sieve membrane is calculated as the ratio of its permeance of $CO_2$ to its permeance of $CH_4$ (i.e., the $CO_2$ permeance divided by the $CH_4$ permeance). The permeance value is a pressure-normalized flux of the relevant component per unit of transmembrane pressure driving force. The flux of a component through the membrane is the number of moles of the particular component that passes through a unit of membrane surface area normal to the membrane thickness per unit of time.

Another measure of the separation performance of supported gas separation molecular sieve membranes of the invention is its separation index. The separation index of a supported gas separation molecular sieve membrane takes into account both orders of merit usually associated with membranes, permeance and selectivity, and therefore does not over emphasize one of the two factors. The separation index (SI) is defined as the $CO_2$ permeance multiplied by the quantity of (separation selectivity minus 1) multiplied by the permeate pressure. The separation index may be represented by the following formula:

SI=($CO_2$ permeance)×(selectivity−1)×(permeate pressure).

The calcined coated porous support of the invention should exhibit a characteristically high separation index of at least 7, preferably, at least 7.5, and, most preferably, at least 8. The separation index is based on a feed pressure of 222 kPa, a permeate pressure of 84 kPa ($\Delta=138$ kPa) and a temperature of 22° C.

The supported gas separation molecular sieve membrane of the invention can be used in a wide variety of gas separation applications. For example, it may be used in the separation of low molecular weight alkanes from relatively higher molecular weight alkanes, or normal alkanes from isoalkanes, or low molecular weight hydrocarbons (e.g. methane, ethane, propylene, butane, ethylene, propylene, and butylenes) from inorganic or non-hydrocarbon compounds, including acidic contaminants.

A particularly useful application of the supported gas separation membrane is in the separation of an acidic component from a mixture comprising $CO_2$ and one or more hydrocarbons. Preferably, the hydrocarbons are selected from the group consisting of $CH_4$, $C_2H_6$, $C_3H_8$, $C_4H_{10}$.

The acidic contaminant of the feed stream is, generally, an acidic compound that is normally in the gas phase at the typical temperature and pressure conditions of a produced natural gas stream. The acidic contaminant is, thus, one selected from the group of acidic compounds consisting of carbon dioxide, hydrogen sulfide, carbonyl sulfide, and any combination or mixture of two or more thereof. The acidic contaminant portion of the feed stream of the invention may include substantially a single acidic contaminant, for example, carbon dioxide, or it may include a combination or mixture of the acidic contaminants, for example, both carbon dioxide and hydrogen sulfide or carbonyl sulfide, or both.

The acidic contaminant, either as an individual acidic compound or as a combination of the individual acidic compounds, can be present in the feed stream at an acidic contaminant concentration in the range of from 20 volume percent (vol %) to 85 vol % of the feed stream. More particularly, the acidic contaminant concentration may be in the range of from 30 vol % to 80 vol %, and, most particularly, from 50 vol % to 75 vol %.

The supported gas separation membrane of the invention is considered to be especially useful in applications involving the separation of $CO_2$ from gas mixture streams comprising an exceptionally high percentage concentration of $CO_2$ in a hydrocarbon and $CO_2$ gas mixture. These gas mixture streams can have a concentration of $CO_2$ in the range upwardly to 70 or 85 vol %. Thus, the gas mixture that can be processed using the inventive supported gas separation membrane can have a $CO_2$ concentration in the range of from 5 vol % to 85 vol %, and, more particularly, the $CO_2$ concentration of the gas mixture feed to the feed side of the supported gas separation membrane is in the range of from 30 vol % to 80 vol %, and, most particularly, from 50 vol % to 75 vol %. In a preferred embodiment, the hydrocarbon portion of the mixture is greater than 80% methane.

The pressure on the feed side of the supported gas separation membrane can be in the range of from atmospheric upwardly to 2000 psi. But, more typically, the feed side pressure is in the range of from 5 psi to 1500 psi, and, most typically, from 10 to 1200 psi. The pressure drop across the gas separation membrane system can, typically, be in the range of from 5 psi to 1500 psi, and, most typically, from 10 to 1200 psi.

The operating temperature on the feed side of the supported gas separation membrane can vary widely. The operating temperature can, thus, be in the range of from less than or about −40° C. to 300° C., more typically, from −10° C. to 150° C., and, most typically, from −5° C. to 100° C.

Because the supported gas separation membrane of the invention is selectively permeable to $CO_2$ over $CH_4$, the permeate stream from the supported membrane will be enriched in $CO_2$ with a relatively low concentration of $CH_4$ while the retentate stream will be depleted in $CO_2$, but it will have a high concentration of $CH_4$.

It is understood that separations made using the supported gas separation membrane can depend on a whole host of factors, such as, for example, the length and/or the total membrane surface area of an applicable assembly or system of membrane surfaces, the operating temperature and pressure conditions, including the pressure driving force across a membrane, at which the separation is conducted, the number of separate membrane surfaces connected together to perform a separation (i.e., the total membrane surface area), and other factors.

Recognizing the impact that the previously listed factors have on gas separations, it is desired to use the supported membrane or an assembly thereof to provide a permeate stream having an acidic contaminant concentration that is significantly high and exceeding 70 vol %. Preferably, the acidic contaminant concentration of the permeate stream can exceed 85 vol %. Preferably, the permeate stream comprises greater than 90 vol % of the acidic contaminant, and, most preferably, the acidic contaminant content of the permeate stream can be in the range of from 75 vol % to about 99 vol %. More preferably, the acidic contaminant concentration is in the range of from 80 vol % to about 99 vol %.

It is also desirable for the retentate stream to be significantly depleted of the acidic contaminant, thus, the concentration of light hydrocarbon therein can be at least 85 vol % light hydrocarbon. More preferably, the light hydrocarbon content of the retentate stream is greater than 90 vol %, and, most preferably, it is in the range of from 95 vol % to 99.9 vol %. In the preferred process, the retentate stream contains light hydrocarbon in the range of from 95 vol % to 99.9 vol %. It is especially desirable for the retentate stream to be pipeline-ready so that it may be discharged directly into a pipeline for transportation to end-users.

FIG. 1:

Reference is now made to FIG. 1, which presents a cross-section of a single tubular supported gas separation membrane 10 of the invention. FIG. 1 depicts a single, circular tube, but it should be understood that the supported gas separation membrane 10 can be selected from any of the suitable geometries mentioned herein, including polygonal supports, multichannel supports, monolithic supports, and hollow fiber supports. Also, the tubular supported gas separation membrane 10 may be manifolded together with a plurality of other such tubes to form an assembly (not shown) of tubes for use in gas separation.

The tubular supported gas separation membrane 10 depicted in FIG. 1 includes a tubular porous support 12 having an inside surface 14 and an outside surface 16 that together define a wall thickness 18. The inside surface 14 defines an inside diameter 22 and a tubular conduit 24 which provides a feed side of the tubular supported gas separation membrane 10 for receiving therein and passing therethrough a gas mixture.

It is noted that, in the situation when the geometry of the support structure is something other than tubular, for example, multichannel supports, monolithic supports or the like, the inside surface of the conduits of such structures relative to the outside dimensions does not take on the same significance as in the use of individual tubular support structures.

The surface areas of the inside surface 14 and the outside surface 16 can either or both be coated with a thin membrane layer of molecular sieve crystals. But, a preferred embodiment is shown in FIG. 1 with only the inside surface 14 coated with a thin, selectively permeable membrane layer 26 of molecular sieve crystals.

The tubular supported gas separation membrane 10 further has feed inlet end 28 for receiving a gaseous mixture that comprises two or more gas components such as a first gas component and a second gas component that is introduced into tubular conduit 24 by way of line 30. The tubular conduit 24 in this instance serves as the feed side of the tubular supported gas separation membrane system 10.

The gaseous mixture introduced into conduit 24 may comprise two or more gas components selected from carbon dioxide, hydrocarbons (such as, methane, ethane, propane, butane), non-hydrocarbons (such as, hydrogen sulfide, carbonyl sulfide, nitrogen), and other molecules that are gaseous under the conditions of use of the tubular supported gas separation membrane 10.

As the gaseous mixture passes through tubular conduit 24 a separation takes place whereby the first gas component, which is more permeable through the membrane layer 26 than the second gas component, preferentially passes through membrane layer 26 to permeate side 32 of the tubular supported gas separation membrane 10. A permeate stream is yielded and passes from the permeate side 32 by way of line 34. The permeate stream is rich in the first gas component.

The tubular supported gas separation membrane 10 also has a retentate outlet end 38 for passing a retentate stream depleted of the first gas component of the gaseous mixture from the tubular conduit 24. The retentate stream is yielded and passes from the feed side, i.e., tubular conduit 24, by way of line 40.

The following examples are presented to illustrate the invention, but they should not be construed as limiting the scope of the invention.

EXAMPLE 1

This Example describes, generally, the procedure used for the preparation of SAPO-34 membranes that were formed upon the inside surfaces of porous, tubular stainless steel supports having a length of 5 cm.

Preparation of Seed Crystals

Seed crystals for seeding the porous, stainless steel supports were made using a seed crystal solution (synthesis mixture) having the following composition: $1.0\ Al_2O_3$:$1.0\ P_2O_5$:$0.3\ SiO_2$:$1.0$ tetraethylammonium hydroxide (TEAOH):$1.6$ dipropylamine (DPA):$77\ H_2O$ (molar ratio). In the synthesis of the seed crystals, the aluminum source, $H_3PO_4$ and deionized $H_2O$ were mixed and stirred for 3 hours to form a homogenous solution. Then LUDOX® AS-40 colloidal silica (40 wt % suspension in water, Sigma-Aldrich) was added thereto with the resulting solution being stirred for another 3 hours. Tetraethylammonium hydroxide (TEAOH, 35 wt % solution in water, Sigma-Aldrich), and dipropylamine (99%, Aldrich) were thereafter added, and the seed crystal solution was stirred for 4 days at 40-45° C.

The seed crystal solution was then placed in an autoclave and held at 220° C. for 24 hours. After the seed crystals solution was cooled to room temperature, it was then centrifuged at 2700 rpm for 20 minutes to separate the seed crystals, which were then washed with water. This procedure was repeated 4 times. The resultant seed crystal precipitate was dried and thereafter calcined for 5 hours at 550° C. The calcination heating rate was 1° C./min and cooling rate was 2° C./min. The calcined seed crystals were stored in a vacuum oven at 70° C.

Seeding

The insides of several (5 cm length) porous, stainless steel tubes (0.1 grade, 0.27 µm pores, Mott Corp.) were seeded with the previously prepared calcined SAPO-34 crystals (described above) by physically rubbing the crystals on the inside of the tubes. The outsides of the porous, stainless steel tubes were masked by wrapping them with polytetrafluoroethylene tape.

The seeded stainless steel tubes were then placed vertically within an autoclave that contained the synthesis gel.

Synthesis Gel

Different molar ratios of water were used to prepare the synthesis gel as shown in Tables 1 & 2. The synthesis gel used for the growth of the membranes was a solution of $1.0\ Al_2O_3$:$1.0\ P_2O_5$:$0.3\ SiO_2$:$1.0\ TEAOH$:$1.6\ DPA$:$x\ H_2O$ (molar ratio). The procedure for the preparation of this synthesis gel was similar to that used for the above-described preparation of the seed crystal solution. Different aluminum sources were used for this step. The membranes formed using aluminum isopropoxide (99.99% Al(O—I—Pr)$_3$) are shown in Table 1, and the membranes formed using aluminum hydroxide (Al(OH)$_3$) are shown in Table 2.

Crystallization

The membranes were formed by subjecting the porous stainless steel tubes that were immersed into the synthesis gel contained within the autoclave to hydrothermal crystallization conditions that included a crystallization temperature of 220° C. for crystallization times of six hours.

After the crystallization was completed each membrane was washed with distilled water at 22° C. and dried at 100° C. in a vacuum oven for 2 hours. Each membrane was then calcined in air at 390° C. for 10 hours to remove the templating agents from the zeolite framework. The heating rate was 0.6° C./min and the cooling rate was 0.9° C./min.

EXAMPLE 2

This Example 2 summarizes the procedure and method for measuring and determining the performance characteristics, for example, gas ($CO_2$ and $CH_4$) permeability and $CO_2/CH_4$ separation selectivity of the membranes made by the procedure described in Example 1.

$CO_2/CH_4$ mixture permeations were measured by the use of an experimental flow measurement system. A membrane was mounted in a stainless steel module and sealed at each end with silicone o-rings. The pressure on each side of the membrane was independently controlled. The feed contained 50 mol % $CO_2$ and 50 mol % $CH_4$. The feed and permeate pressures were 223 kPa and 85 kPa, respectively. Fluxes were measured using a soap film bubble flow meter. The compositions of the feed, retentate and permeate streams were measured using a HP 5890 gas chromatograph with a TCD and a HAYESEP-D column (Alltech). The oven, injector, and detector temperatures were all at 150° C. The measured selectivities are permselectivities which is the ratio of the permeance of each gas. The permeances were calculated as the fluxes divided by the partial pressure driving forces. Because the module has a cross-flow design, a logarithm of the mean pressure drop was used to calculate the driving force. The $CO_2$ permeance and $CO_2/CH_4$ selectivity are shown in Tables 1 & 2.

TABLE 1

| Membrane | X ($H_2O:Al_2O_3$) | CO2 permeance × $10^7$ [mol/($m^2$sPa)] | $CO_2/CH_4$ selectivity |
|---|---|---|---|
| A | 77 | 5.0 | 127 |
| B | 150 | 4.9 | 277 |
| C | 200 | 4.3 | 212 |
| D | 250 | 2.7 | 215 |
| E | 350 | 3.5 | 124 |

TABLE 2

| Membrane | X ($H_2O:Al_2O_3$) | CO2 permeance × $10^7$ [mol/($m^2$sPa)] | $CO_2/CH_4$ selectivity |
|---|---|---|---|
| F | 77 | 3.5 | 118 |
| G | 150 | 4.4 | 282 |
| H | 200 | 2.9 | 262 |
| I | 250 | 3.9 | 259 |

As seen from the examples, membranes prepared with diluted synthesis gel mixtures can provide satisfactory results in light of the results obtained from membranes made using undiluted synthesis gel mixtures.

We claim:

1. A method of preparing a supported gas separation membrane, wherein the method comprises:
   a. preparing SAPO-34 crystalline seeds from a synthesis mixture comprising an aluminum source, a phosphorous source, a silicon source, at least one organic templating agent and water;
   b. applying the SAPO-34 crystalline seeds to a porous support to produce a seeded porous support;
   c. contacting the seeded porous support with a synthesis gel under hydrothermal synthesis conditions to produce a coated porous support; and
   d. calcining the coated porous support to provide the supported gas separation membrane with a molecular sieve membrane layer;
   wherein the molar ratio of water to $Al_2O_3$ of the synthesis gel in step (c) is greater than the molar ratio of water to $Al_2O_3$ of the synthesis mixture of step (a), and wherein the molar ratio of water to $Al_2O_3$ in step (c) is at least 150:1.

2. The method according to claim 1, wherein the synthesis mixture of step (a) comprises the components in the following molar ratios:
   1 $Al_2O_3$ (aluminum source) :
   a $P_2O_5$ (phosphorus source) :
   b $SiO_2$ (silicon source) :
   c R (organic templating agent) :
   d $H_2O$;
   wherein
   a is from 0.01 to 10;
   b is from 0.03 to 196;
   c is from 0.2 to 5; and
   d is from 1 to 1000.

3. The method as claimed in claim 2 wherein a is from 0.5 to 3; b is from 0.1 to 2; c is from 0.5 to 5; and d is from 50 to 300.

4. The method according to claim 1, wherein the organic templating agent of the synthesis mixture is selected from the group consisting of tetraethylammonium hydroxide, dipropylamine, and cyclohexylamine and combinations thereof.

5. The method according to claim 1, SAPO-34 crystalline wherein the seeds prepared in step (a) are dried and calcined before application in step (b).

6. The method according to claim 1, wherein the seeds SAPO-34 crystalline are calcined at a temperature of greater than 500° C.

7. The supported gas separation membrane made by the method as claimed in claim 1.

8. A supported gas separation membrane made by the method claimed in claim 2.

9. A supported gas separation membrane made by method of claim 3.

10. A supported gas separation membrane made by method of claim 4.

11. The method according to claim 2, wherein the synthesis gel of step (c) comprises the components in the following molar ratios:
   1 $Al_2O_3$ (synthesis gel aluminum source)
   e $P_2O_5$ (synthesis gel phosphorus source)
   f $SiO_2$ (synthesis gel silicon source)
   g R' (synthesis gel templating agent)
   h $H_2O$
   wherein
   e is from 0.01 to 52;
   f is from 0.03 to 196;
   g is from 0.2 to 5; and
   h is from 20 to 1000.

12. The method according to claim 11, wherein the aluminum source of the synthesis mixture used to prepare the SAPO-34 crystalline seeds is aluminum alkoxide and the synthesis gel aluminum source for the synthesis gel is aluminum hydroxide.

13. The method according to claim 12, wherein the organic templating agent of the synthesis mixture is different from the synthesis gel templating agent of the synthesis gel.

14. The method according to claim 13, wherein the organic templating agent of the synthesis mixture is cyclohexylamine and the synthesis gel templating agent of the synthesis gel is a compound other than cyclohexylamine.

15. The method according to claim 14, wherein the hydrothermal synthesis conditions include a hydrothermal temperature in the range of from 50° C. to 300° C. and an autogenous pressure in the range up to 100 bar.

16. The method according to claim 15, wherein the step of contacting the seeded porous support with the synthesis gel is carried out for a contacting time in the range of from about 1 hour to about 36 hours.

17. The method according to claim 16, wherein the molecular sieve membrane layer has a thickness in the range of from 0.001 μm to 50 μm.

18. The method according to claim 17, wherein the step of calcining the coated porous support is conducted at a calcination temperature in the range of from about 300° C. to about 650° C.

19. The method according to claim 18, wherein the SAPO-34 crystalline seeds prepared in step (a) are calcined at a temperature in the range of from 400° C. to 600° C. and for a calcination time period in the range of from 1 to 24 hours.

20. The method according to claim 19, wherein the SAPO-34 crystalline seeds comprise crystals of sizes in the range of from 0.1 μm to 8 μm.

21. A process for separating a first gas component from a gas mixture comprising the first gas component and a second gas component, which process comprises:
  a. providing a gas separation molecular sieve membrane prepared by any one of the methods of claims 1, 2, 3, 4, 5, 6, and 11 through 20 having a feed side with a feed inlet and a retentate outlet; and a permeate side, wherein the gas separation molecular sieve is selectively permeable to the first gas component over the second gas component;
  b. introducing the gas mixture to the feed inlet yielding a permeate stream from the permeate side of the gas separation molecular sieve membrane and a retentate stream from the retentate outlet wherein the retentate stream is depleted of the first gas component and the permeate stream is rich in the first gas component.

22. A supported gas separation membrane that comprises: a porous support having a surface treated with a layer of SAPO-34 crystalline seeds that were recovered from a synthesis mixture to thereby provide a seeded porous support that was contacted with a synthesis gel under hydrothermal synthesis conditions to thereby provide a coated porous support that was calcined to provide said supported gas separation membrane with a molecular sieve membrane layer, wherein the molar ratio of water to $Al_2O_3$ of said synthesis gel is greater than the molar ratio of water to $Al_2O_3$ of said synthesis mixture, and wherein the molar ratio of water to $Al_2O_3$ when the seeded porous support was contacted with the synthesis gel was at least 150:1.

23. A supported gas separation membrane as recited in claim 22, wherein the SAPO-34 crystalline seeds were recovered from a synthesis mixture comprising the components in the following molar ratios:
  1 $Al_2O_3$ (aluminum source)
  a $P_2O_5$ (phosphorus source)
  b $SiO_2$ (synthesis gel silicon source)
  c R' (synthesis gel templating agent)
  d $H_2O$
wherein
  a is from 0.01 to 10;
  b is from 0.03 to 196;
  c is from 0.2 to 5; and
  d is from 1 to 1000;
wherein the SAPO-34 crystalline seeds are dried calcined at a temperature in the range of from 400° C. to 600° C. and for a calcination time period in the range of from 1 to 24 hours; and wherein the SAPO-34 crystalline seeds comprise crystals of sizes in the range of from 0.1 μm to 8 μm.

24. A supported gas separation membrane as recited in claim 23, wherein the hydrothermal synthesis conditions include a hydrothermal temperature in the range of from 50° C. to 300° C. and an autogenous pressure in the range up to 100 bar.

25. A supported gas separation membrane as recited in claim 24, wherein the coated porous support was calcined at a calcination temperature in the range of from about 300° C. to about 650 ° C.

26. A supported gas separation membrane as recited in claim 25, wherein the molecular sieve membrane layer has a thickness in the range of from 0.001 μm to 50 μm.

27. A supported gas separation membrane as recited in claim 26, wherein the synthesis gel comprises the components in the following molar ratios:
  1 $Al_2O_3$ (synthesis gel aluminum source)
  e $P_2O_5$ (synthesis gel phosphorus source)
  f $SiO_2$ (synthesis gel silicon source)
  g R' (synthesis gel templating agent)
  h $H_2O$
wherein
  e is from 0.01 to 52;
  f is from 0.03 to 196;
  g is from 0.2 to 5; and
  h is from 20 to 1000; and
wherein the aluminum source of the synthesis mixture used to prepare the SAPO-34 crystalline seeds is aluminum alkoxide and the synthesis gel aluminum source for the synthesis gel is aluminum hydroxide; wherein the organic templating agent of the synthesis mixture is different from the synthesis gel templating agent of the synthesis gel; and wherein the organic templating agent of the synthesis mixture is cyclohexylamine and the synthesis gel templating agent of the synthesis gel is a compound other than cyclohexylamine.

* * * * *